(12) United States Patent
Takahashi et al.

(10) Patent No.: US 6,354,944 B1
(45) Date of Patent: Mar. 12, 2002

(54) OPTIMUM VIEWPOINT AUTOMATICALLY PROVIDED VIDEO GAME SYSTEM

(75) Inventors: Yasuhiro Takahashi; Akira Nishino; Yusuke Yoshida; Takeshi Tanaka, all of Tokyo (JP)

(73) Assignee: Sega Corporation, Tokyo (JP)

( * ) Notice: Subject to any disclaimer, the term of this patent is extended or adjusted under 35 U.S.C. 154(b) by 0 days.

(21) Appl. No.: 09/502,935

(22) Filed: Feb. 11, 2000

Related U.S. Application Data

(63) Continuation of application No. 08/973,336, filed as application No. PCT/JP97/00999 on Mar. 25, 1997, now Pat. No. 6,126,545.

(30) Foreign Application Priority Data

Mar. 28, 1996 (JP) ................................................ 8-75026

(51) Int. Cl.[7] .................................................. A63F 13/00
(52) U.S. Cl. ......................................... 463/32; 345/419
(58) Field of Search ............................... 463/33, 32, 31, 463/30; 345/418, 419, 429, 355, 473, 474, 475

(56) References Cited

U.S. PATENT DOCUMENTS

| 5,090,909 A | * | 2/1992 | Keller et al. |
| 5,209,662 A | * | 5/1993 | Fujita et al. |
| 5,320,351 A | * | 6/1994 | Suzuki |
| 5,415,550 A | * | 5/1995 | Aoki et al. |

FOREIGN PATENT DOCUMENTS

| JP | 06-068238 | * | 3/1994 |
| JP | 07-085312 | * | 3/1995 |

OTHER PUBLICATIONS

Hard Drivin', Operator's Manual, 1988.*

* cited by examiner

*Primary Examiner*—Michael O'Neill
(74) *Attorney, Agent, or Firm*—Lackenbach Siegel Marzullo Aronson & Greenspan P.C.

(57) ABSTRACT

This invention was devised in order to create a favourable playing environment in a video game by automatically providing an optimum viewpoint without placing a burden on the player. In an image processing method whereby images, wherein the figure of a character and the figure of a peripheral landscape set in a virtual spatial coordinates system are viewed from a prescribed viewpoint, are generated, and image display signals corresponding to these images are output, there are provided: a viewpoint calculating step S1 for determining a second point on said peripheral landscape which is at a prescribed horizontal distance from a first point previously set inside the character; a line of sight calculating step S2 for determining the line of sight by linking the first point and the second point by means of a straight line; a viewpoint calculating step S3, for setting as the viewpoint a point on the line of sight which is at a prescribed distance from the first point; and a drawing step S4 for obtaining an image viewed from this viewpoint.

20 Claims, 9 Drawing Sheets though various obstacles, there are cases where the coordinate axis in which a detailed perception of distance is required may change depending on the shape of the landscape in which the character operated by the player is moving, or the player's own preferences or skill level. In other words, it is not possible to create an appropriate playing environment using only a single type of viewpoint.

Technology corresponding to this is represented by a "virtual button". This is a device whereby a desired viewpoint is continually selected from a plurality of prepared types of viewpoint, in accordance with the player's individual preferences.

However, using a "virtual button" has a disadvantage in that it adds an "operation for changing the viewpoint" to the original game operation, and therefore makes the game operation more complex. Furthermore, since the player has to look for the optimum viewpoint him or herself, it obstructs his or her concentration on playing the game.

This invention was devised in order to overcome problems of this kind, an object thereof being to provide an image processing device whereby an optimum viewpoint is automatically provided, thus creating a favourable game environment, without burdening the player, and a game machine using this image processing device, an image processing method and a medium whereon programs for same are recorded.

OPTIMUM VIEWPOINT AUTOMATICALLY PROVIDED VIDEO GAME SYSTEM

This application is a continuation of Ser. No. 08/973,336, filed Nov. 28, 1997, now U.S. Pat. No. 6,126,545.

TECHNICAL FIELD

This invention relates to an image processing device for displaying images whereby central figures or peripheral figures set in a virtual spatial coordinates system are viewed from a certain viewpoint, a game machine using this processing device, an image processing method and a medium.

BACKGROUND ART

With the progress in computer graphics technology in recent years, data processing devices such as video game machines and simulation machines have become commonly used. A video game machine, for example, is provided with peripherals, such as game pads, joysticks, a monitor, or the like, and a game main unit containing a CPU which implements image processing, sound processing, data communications with the peripherals, and the like. Image processing in video game machines is extremely important in terms of raising the value of the product, and therefore technology for reproduction of animated images has also become highly advanced in recent years. For example, games involving stereoscopic three-dimensional (3D) image representations, rather than two-dimensional images, have come to be widely played, and highly advanced image processing is conducted in games of this kind.

In cases where graphics for game screens are created by means of 3D calculation in order to display three-dimensional images, the representation of images of the game field or player's characters located therein depends greatly on which viewpoint the three-dimensionally created objects are to be observed from. For example, if the viewpoint is set directly to the side of a character, then in the terms of the 3D game, this will produce a "side view", and if the viewpoint is set to directly above a character, then this will correspond to a "top view".

Since the display device used in a video game is a two-dimensional cathode ray tube, it is inevitably difficult to perceive distances in the front-back direction with respect to the screen. Therefore, it a common technique to set a viewpoint such that, of the three-dimensional coordinate axes, X, Y and Z, a coordinate axis wherein detailed perception of distance is not required in relation to the contents of the game is set in the front-back direction, namely, perpendicular to the front plane.

For example, in a 3D shooting game, as shown in FIG. 14, enemies and missiles approach from in front and the player's craft has to avoid these enemies and missiles by moving up and down, and left and right. In this case, the player moves in the up and down direction and left and right direction and these directions are therefore very important. On the other hand, the front-back distance is of little relative importance. Therefore, in a 3D shooting game of this kind, the two-dimensional screen is set in the up-down and left-right planes, whilst the front-back plane is set perpendicular to this.

In this way, in a 3D shooting game it is not especially an impediment if the line of sight is fixed in a forward direction, but there exist other types of game. For instance, in a game where the player controls a character to fight with opponents, or in a game where the character has to break through various obstacles, there are cases where the coor-

DISCLOSURE OF THE INVENTION

In an image processing device, which generates images wherein a central figure and peripheral figures set in a virtual spatial coordinates system are viewed from a prescribed viewpoint, and outputs image display signals corresponding to these images, the image processing device relating to this invention comprises focal point calculating means for determining a second point on the peripheral figures on the basis of a first point previously set with respect to the central figure, line of sight calculating means for determining a line of sight on the basis of the first point and the second point, viewpoint calculating means for determining the viewpoint on the basis of the first point and the line of sight, and image signal generating means for generating the image display signals corresponding to the image viewed from the viewpoint in the direction of the line of sight.

A virtual spatial coordinate system is used, for example, in the type of game where a game field is created by 3D calculation, and the player controls a character within that game field. "Central figure" refers to the character being operated by the player, for example. "Peripheral figures" refers the landscape, buildings, obstacles etc. surrounding the character, and in a fighting game, or the like, it also includes opponent characters.

The first point may be set, for example, inside the character's head, or the like. In this case, the line of sight will appear natural to the player. However, the first point does not have to be set inside the character, but may also be set outside the character, for instance, above the character's head.

The second point may be set, for example, on the surface, inside or outside the landscape at a prescribed distance from the first point.

The line of sight is, for example, a straight line linking the first point with the second point.

The viewpoint is set, for example, in a position on the line of sight on the opposite side to the second point, at a prescribed distance from the second point.

Furthermore, in the image processing device relating to this invention, the focal point calculating means determines a point on the peripheral figure which is at a predetermined first distance from the first point, and sets this point as the second point.

The first distance may have a fixed value, or it may be selected or changed according to circumstances. Furthermore, the first distance is a distance in the horizontal plane, for example.

Moreover, the image processing device relating to this invention determines the first distance in accordance with the movement of the central figure.

For example, if the character is moving quickly, then the first distance is set to a large distance such that a broad field of view is obtained by looking into the far distance, whereas if the character is moving slowly, the first distance is set to a small distance such that near objects can be viewed in detail.

Furthermore, in the image processing device relating to this invention, if a moving figure is included in the peripheral figures, then the focal point calculating means sets a point corresponding to the moving figure as the second point.

A moving figure may be, for example, an opponent character in a fighting game. The second point may be set, for example, inside the opponent character's head, or the like. However, the second point does not have to be set inside the opponent character, but may also be set outside the character, for instance, above the character's head.

Furthermore, in the image processing device relating to this invention, the viewpoint calculating means determines a point on the line of sight which is at a predetermined second distance from the first point and sets this point as the viewpoint.

The second distance may have a fixed value, or it may be selected or changed according to circumstances. The second distance may be a distance in three-dimensional space or it may be a distance in a horizontal plane.

In the image processing device relating to this invention, the second distance is taken as a distance in a horizontal plane, coordinates which are at the second distance from the first point projected in this horizontal plane are determined, these coordinates are set as the horizontal plane coordinates of the viewpoint, and the viewpoint is determined on the basis of these horizontal plane coordinates, and moreover, a maximum value for the distance between the first point and the viewpoint is determined, and if this maximum value is exceeded, the viewpoint is determined such that the distance between the first point and the viewpoint does not exceed the maximum value, regardless of the second distance.

If the second distance is taken as a distance in the horizontal plane, then the viewpoint may be set in an unnaturally distant position from the first point, depending on the angle of the line of sight, and therefore a maximum value is provided such that it is not distanced by more than a certain value.

In the image processing device relating to this invention, the second distance is determined in accordance with the size of the central figure.

For example, if the character is large, or if there are a plurality of characters, the second distance is set to a large distance, so that all of the characters can be seen, whereas if the characters are small, or there is only one character, then the second distance is set to a short distance.

The game machine relating to this invention is provided with any one of the image processing devices described above, and the central figure is taken as the figure of a game character, and the peripheral figure is taken as the figure of a landscape.

In an image processing method whereby images wherein a central figure and peripheral figures set in a virtual spatial coordinates system are viewed from a prescribed viewpoint are generated, and image display signals corresponding to these images are generated, the image processing method relating to this invention is such that a second point on the peripheral figure is determined on the basis of a first point previously set with respect to the central figure, a line of sight is determined on the basis of the first point and the second point, the viewpoint is determined on the basis of the first point and the line of sight, and the image display signals are generated corresponding to the image viewed from the viewpoint in the direction of the line of sight.

Furthermore, the image processing method relating to the present invention is such that, if the central figure is taken as the figure of a game character, and the peripheral figure is taken as the figure of a landscape, an image is generated in an upward-looking line of sight when the landscape in the direction that the character is facing is high, and an image is generated in a downward-looking line of sight when the landscape in the direction that the character is facing is low.

Moreover, the image processing method relating to the present invention is such that, if the central figure is taken as the figure of a game character, and the peripheral figure is taken as the figure of a landscape and an opponent character, then an image is generated in a line of sight from the character towards the opponent character.

BEST MODE FOR CARRYING OUT THE INVENTION

First Mode of Implementation

Below, a preferred mode for implementing the present invention is described with reference to FIG. 1–FIG. 9. In this mode of implementation, a case where an image processing device according to the present invention is applied in a video game machine is described.

Figure 1:
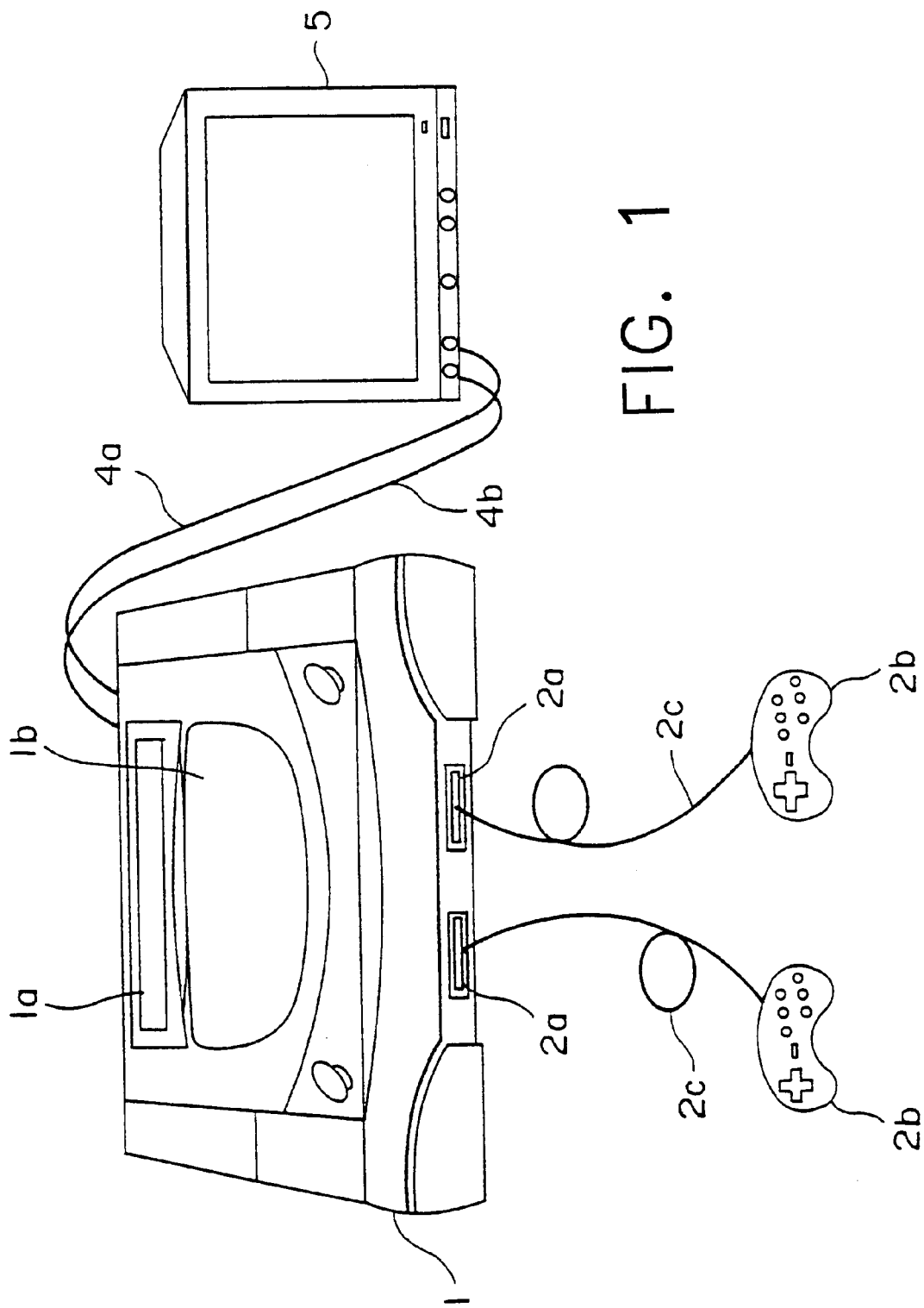
FIG. 1 is a general oblique view of a video game machine incorporating an image processing device according to a first mode for implementing this invention.

FIG. 1 shows an external view of a video game machine relating to a mode for implementing this invention. In this diagram, symbol 1 indicates a video game main unit. Two connectors 2a are provided on the front of a video game main unit 1, and peripherals 2b such as game pads for controlling the game are connected respectively to these connectors 2a via cables 2c. Furthermore, a cartridge interface (I/F) 1a for connecting a ROM cartridge and a CD-ROM drive 1b for reading a CD-ROM are provided on the upper portion of the video game main unit 1. Although not shown in the diagram, a video output terminal and audio output terminal are provided on the rear side of the video game machine. This video output terminal connects to the video input terminal of a TV receiver 5 via a cable 4a, and the audio output terminal connects to the audio input terminal of a TV receiver 5. In a video game of this kind, by operating the peripherals, the user is able to play a game whilst watching the screen displayed on the TV receiver 5.

Figure 2:
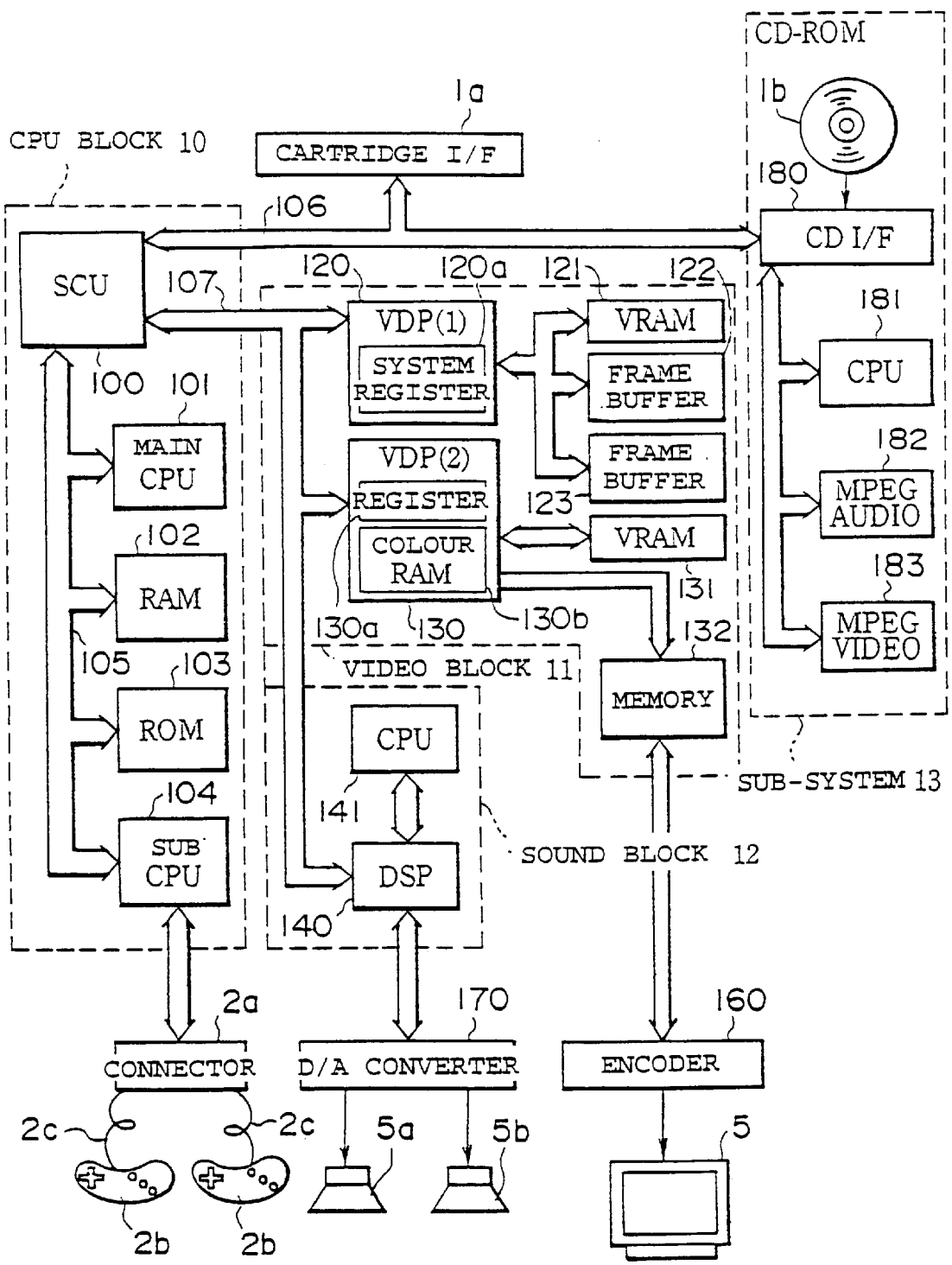
FIG. 2 is a block diagram of a video.game machine incorporating an image processing device according to a first mode for implementing this invention.

FIG. 2 is a block diagram showing an overview of a video game machine relating to a mode of implementing this invention. This video game machine comprises a CPU block 10 for controlling the device as a whole, a video block 11 for controlling the game screen display, a sound block 12 for generating sound effects, and the like, and a subsystem 13 for reading a CD-ROM, and the like.

The CPU block 10 comprises an SCU (System Control Unit) 100, main CPU 101, RAM 102, ROM 103, cartridge I/F 1a, sub-CPU 104, CPU bus 105, and the like. The main CPU 101 controls the whole device. This main CPU 101 comprises an internal calculating function similar to a DSP (Digital Signal Processor), which is omitted from the drawings, and it is capable of implementing applicational software at high speed.

The RAM 102 is used as the work area for the main CPU 101. Initial programs and the like used for start-up processing are written into the RON 103. Reciprocal data input and output between the main CPU 101, VDP 120, 130, DSP 140, CPU 141, and the like, is conducted smoothly by controlling the buses 105, 106 and 107.

The SCU 100 comprises an internal DMA controller, and is capable of transferring character data (polygon data) relating to the game to the VRAM in the video block 11. Thereby, the applicational software for the game, or the like, can be implemented at high speed.

The cartridge I/F 1a serves to input applicational software supplied in the ROM cartridge format.

The sub-CPU 104 is called an SMPC (System Manager & Peripheral Controller), and it performs the function of collecting peripheral data from the peripherals 2b via the connectors 2a in FIG. 1, according to the requirements of the main CPU 101. The main CPU 101 performs image control, such as rotational conversion or perspective conversion of the characters in the game screen, for example, on the basis of the peripheral data supplied by the sub-CPU 104. The connectors 2a can be connected to desired peripherals, such as game pads, joysticks, keyboards, or the like. The sub-CPU 104 automatically identifies the type of peripheral that is connected to the connectors 2a (main unit terminals) and it performs the function of collecting peripheral data and the like in accordance with the communications system corresponding to that peripheral type.

The video block 11 comprises a first VDP (Video Display Processor) 120 which draws polygon screens ascribed to characters and background images consisting of polygon data in the video game, and a second VDP 130 which draws scroll background screens and performs image synthesis, clipping, and the like, of polygon image data and scroll image data on a priority (display priority order) basis.

Of these, the first VDP 120 contains a system register 120a and is connected to the VRAM (DRAM) 121 and two screen frame buffers 122, 123. Polygon drawing data representing the characters in the video game is transferred from the main CPU 101 via the SCU 100 to the first VDP 120, and it is written into the VRAM 121. The drawing data written in to the VRAM 121 is, for example, transferred into a drawing frame buffer 122 (or 123) in a 16 or 8 bit/pixel format. The data stored in frame buffer 122 (or 123) is transferred by the second VDP 130 when the device is in display mode.

On the other hand, the second VDP 130 contains a register 130a and a colour RAM 130b, and is connected to the VRAM 131. Furthermore, the second VDP 130 is connected via bus 107 to the first VDP 120 and the SCU 100, and it is also connected via a memory 132 and an encoder 160 to a TV receiver 5.

Scroll image data for the second VDP 130 is defined by the main CPU 101 in the VRAM 131 and colour RAM 130b via the SCU 100. Information for controlling the image display is similarly set in register 130a of the second VDP 130. The data defined in VRAM 131 is read out by the second VDP 130 in accordance with the contents set in the register 130a, and it forms image data for each scroll screen representing the background relating to the characters. The image data for each scroll screen and the image data for polygon data supplied from the first VDP 120, which has been texture mapped, are assigned a display priority order (priority) according to the setting in register 130a, and they are synthesized into the final display image data.

If this image display data is in a pallet format, the second VDP 130 reads out the colour data defined in the colour RAM 130b according to the values therein, and generates display colour data. If the display image data is in RGB format, the image display data is taken directly as display colour data. This display colour data is stored in the memory 132 and then output to the encoder 160. The encoder 160 generates a video signal by appending a Synchronizing signal, or the like, to this image data, and outputs this video signal to the TV receiver. By this means, a game screen is displayed on the TV receiver.

The sound block 12 comprises a DSP 140 which synthesizes sound by means of a PCM system or FM system, and a CPU 141 which controls this DSP 140, and the like. Sound data generated by the DSP 140 is converted to a two-channel signal by a D/A converter and then output to two speakers 5a.

The sub-system 13 comprises a CD-ROM drive 1b, a CD I/F 180, MPEG AUDIO 182, MPEG VIDEO 183, and the like. This sub-system 13 performs the function of reading out applicational software supplied in CD-ROM format, or the like, and reproducing animated pictures, or the like. The CD-ROM drive 1b inputs data from the CD-ROM. A CPU 181 controls the CD-ROM drive 1b and conducts error processing and the like on the input data. The data read from the CD-RON is supplied via the CD I/F 180, bus 106 and SCU 100 to the main CPU 101, and it is used as applicational software. The MPEG AUDIO 182 and MPEG VIDEO 183 are devices for restoring data compressed according to MPEG (Motion Picture Expert Group) standards. By restoring MPEG compressed data contained on a CD-ROM by means of the MPEG AUDIO 182 and MPEG VIDEO 183 in this way, it is possible to reproduce animated images.

The user places a CD-ROM, which forms the medium on which programs are stored, into the CD-ROM drive 1b, and when a prescribed operation is performed, the contents of the CD-ROM are read out and supplied to the main memory (RM 102 etc.) The CPU 101 performs the actions of the first mode for implementing the invention, as described below, in accordance with the downloaded program.

Apart from a CD-ROM, media which may be used in the first mode for implementing this invention include, for example, a floppy disk, hard disk, magnetic tape, optomagnetic disk, DVD, ROM cartridge, RAM memory cartridge with battery back-up, flash memory cartridge, fixed RAM cartridge, or the like.

Furthermore, a wired communications medium, such as a telephone circuit, or a radio communications medium, such as a microwave circuit, may also be used. The Internet is included in this definition of communications media.

A medium is a entity whereby information (mainly digital data and programs,) can be recorded by a physical means of some kind, and it is able to cause a processing device, such as a computer, special processor, or the like, to implement prescribed functions. In brief, it should enable programs to be downloaded into a computer by some means or other, thereby causing the computer to execute prescribed functions.

Next, the operation of a mode for implementing this invention is described.

When the viewpoint is determined in a three-dimensional game (3D game) implemented a device as shown in FIG. 1 and FIG. 2, in general, a "camera" is envisaged, and the direction in which this "camera" is pointing and the spatial coordinates that it is occupying are set. The image taken by this "camera" is then displayed on a TV screen. In other words, this "camera" represents the player's line of sight. Accordingly, the line of sight adopted by the "camera" is extremely important to the player's ability to control the game, and it is necessary to carry out optimum viewpoint adjustment.

Optimum viewpoint adjustment refers to the direction whereby the most desirable image for the player is obtained. For example, in a 3D shooting game, enemies and missiles approach from in front and the player's craft has to avoid these enemies and missiles by moving up and down, and left and right. In this case, the player moves in the up and down direction and left and right direction and these directions are therefore very important. On the other hand, the front-back distance is of little relative importance. Therefore, in a 3D shooting game of this kind, the two-dimensional screen is set in the up-down and left-right planes, whilst the front-back plane is set perpendicular to this. In other words, the optimum line of sight for the player is a fixed line of sight facing forwards.

However, in a game where the player controls a character which moves through a landscape, there are Cases where the coordinate axis in which a detailed perception of distance is required may change depending on the shape of the landscape in which the character operated by the player is moving, or the player's own preferences or skill level. In other words, unlike the case of a 3D shooting game as described in the example above, it is not possible to create an appropriate playing environment using only a single type of viewpoint.

For example, if the player is going to leap over a ravine, he or she needs to gain an accurate perception of the width of the ravine and the direction in which to leap. Therefore, a viewpoint looking downwards is desirable.

If the player needs to avoid missiles coming from in front of him or her, then a viewpoint looking forwards is desirable, as described above.

The first mode of implementing the present invention automatically conducts optimum viewpoint adjustment by referring to the relationship between the player's character and the landscape in a process known as "camera coordinates and angle determination".

In the description below, the viewpoint is determined on the basis of the character in a game. This is because in an action game, for example, the direction in which the character performs actions, such as moving, attacking, or the like, is defined as the forward direction, and the slayer concentrates mainly on the forward direction when playing the game. If the player wants to perform an action in a different direction, the player should turn the character to face in the desired direction. Therefore, it is possible to maintain convenience in terms of game playing by changing the viewpoint only with respect to the forward environment.

The details of processing are now described using specific examples, with reference to FIG. 3–FIG. 9.

Figure 4:
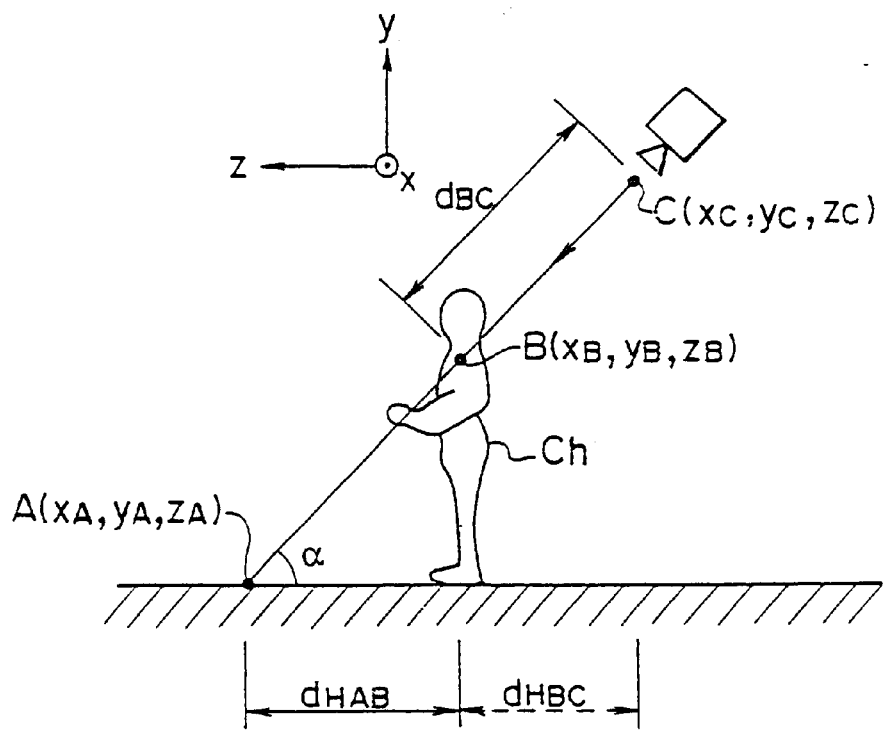
FIG. 4 is a diagram for describing the principles of a method for determining the camera position in a first mode for implementing this invention (viewed from side)
Figure 5:
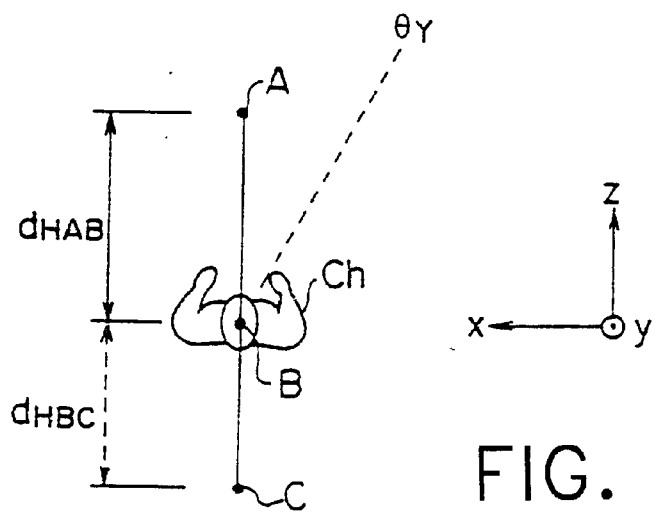
FIG. 5 is a diagram for describing the principles of a method for determining the camera position in a first mode for implementing this invention (viewed from above)

Firstly, as shown in FIG. 4 and FIG. 5, the point in front of the player is defined as A (xA, yA, zA), a desired point inside the player (for example, a point in the head region,) as B (xB, yB, zB), the camera position, as C (xC, yC, zC), the orientation of the player in the XZ plane, as $\theta Y$, the horizontal distance between reference point A and reference point B in front of the player in the XZ plane, as dHAB, and the distance between reference point B and reference point C, as dBC. Point A is a point on the surface of the landscape. If the angle formed between the straight line ABC and the horizontal plane is taken as $\alpha$, then the relationship dHAB= dAB.cos$\alpha$ is formed. The distances dHAB and dBC are determined previously such that an optimum view is obtained when the program is actually run, and these values are stored in the memory by reading out the game software.

The first point B is set inside the character based on the general premise that in games where the player's character is displayed, the player will play the game by operating that character. In other words, it satisfies the following two criteria: (1) that the character must be on the screen in order to proceed with the game; and (2) that the operations required by the player are determined by the relationship between the character and the landscape.

Figure 3:
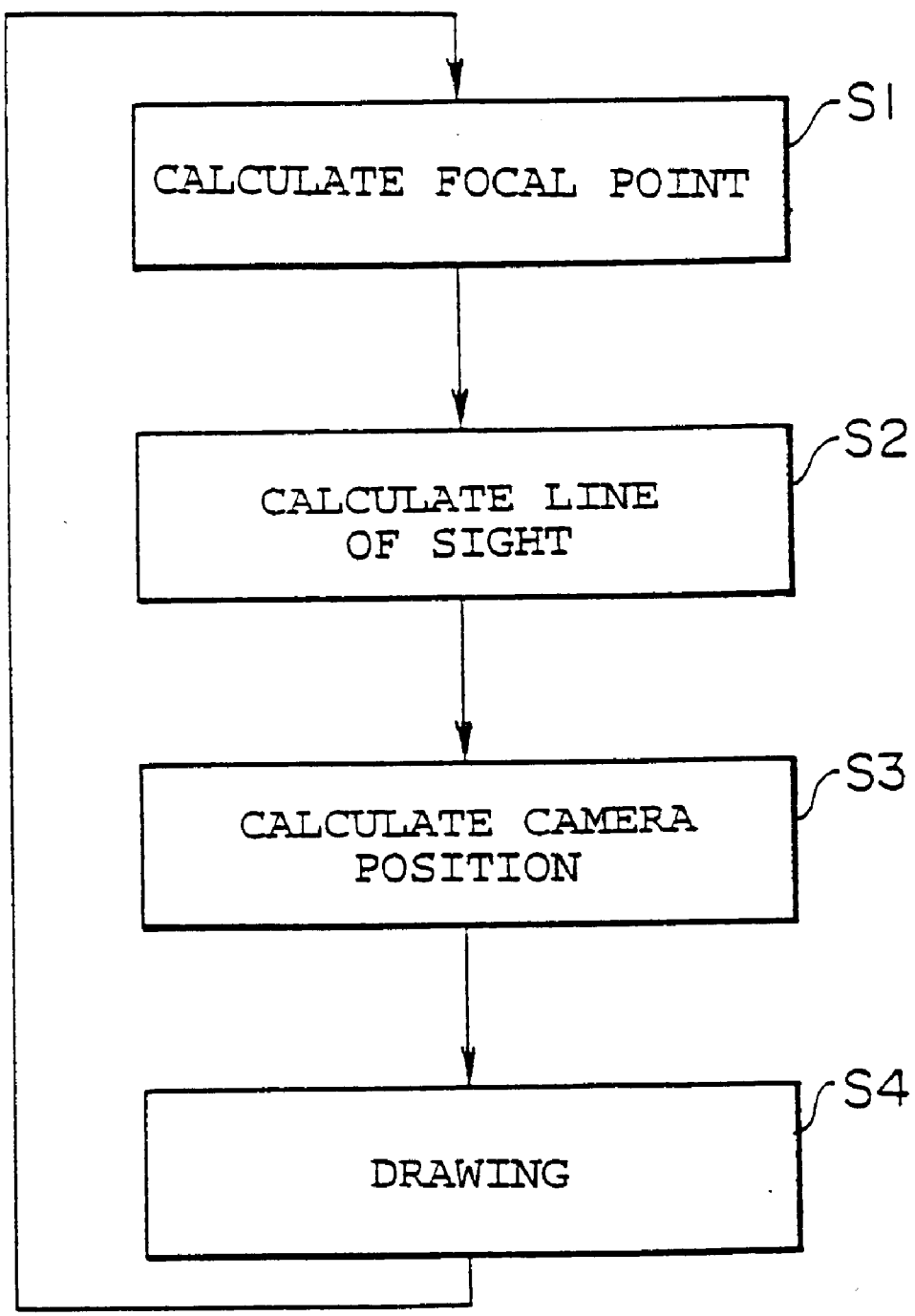
FIG. 3 is an approximate flow-chart of image processing in a first mode for implementing this invention.

Next, the operation is described using the flowchart in FIG. 3.

Step S1: Calculating focal point

When the character Ch has moved to a position, firstly, the point on which that character is focusing is calculated. The coordinate set B (xB, yB, zB), direction $\theta Y$, and the distance dHAB are given.

Firstly, in the XZ plane, the coordinates A (xA, zA) relating to the XZ axis of reference points are derived on the basis of the coordinates B (xB, zB) for the character Ch, the direction $\theta Y$ in which the character Ch is facing, and the distance dHAB. As shown in FIG. 5, these coordinates are the coordinates in the XY plane of the point on which the character Ch is focusing. If the character Ch is facing forwards (direction of z axis in FIG. 5), then A (xA, zA)=B (xB, zB+dHAB). Furthermore, if the character Ch is facing in direction $\theta Y$, then A (xA, zA)=B (xB+dAB.sin$\theta Y$, zB+dAB.cos$\theta Y$) (where the angle formed between the direction in which the character Ch is facing and the Z axis is taken as $\theta Y$.)

In this way, firstly, if coordinates A can be determined in the XZ plane, then they can be determined regardless of the state of the landscape (height of the landscape), and processing is relatively simple.

Coordinates A (xA, zA) determined in this way do not give consideration to landscape data in the Y axis direction, and therefore three-dimensional landscape data is referred to in order to obtain an actual focal point on the landscape. In other words, the device searches for point A (xA, yA, zA) corresponding to coordinates A (xA, zA) from the three-dimensional landscape data.

Step S2: Calculating line of sight

Taking point A (xA, yA, zA) derived in step S1 as a starting point, a straight line (line of sight) passing through point B (xB, yB, zB) is determined. If the two points are given, then the equation of the straight line can be derived readily.

Step S3: Calculating camera position

Next, the camera position C (xC, yC, zC) is derived.

The distance dBC between reference point B and the camera position C is previously determined, as described above, and it is constant. Therefore, coordinates C (xC, yC, zC) are set using the linear equation derived in step S2 such that the distance between reference point B and camera position C is dBC.

Step S4: Drawing

A screen is drawn taking the camera position C (xC, yC, zC) derived in step S3 as the viewpoint. Thereby, an image containing the character Ch and the landscape is obtained.

The processing described above is conducted by the main CPU 101 in FIG. 2. Similar processing can also be implemented in the sub-CPU 104.

The image obtained by means of the above processing is now described using a simple example.

Figure 6:
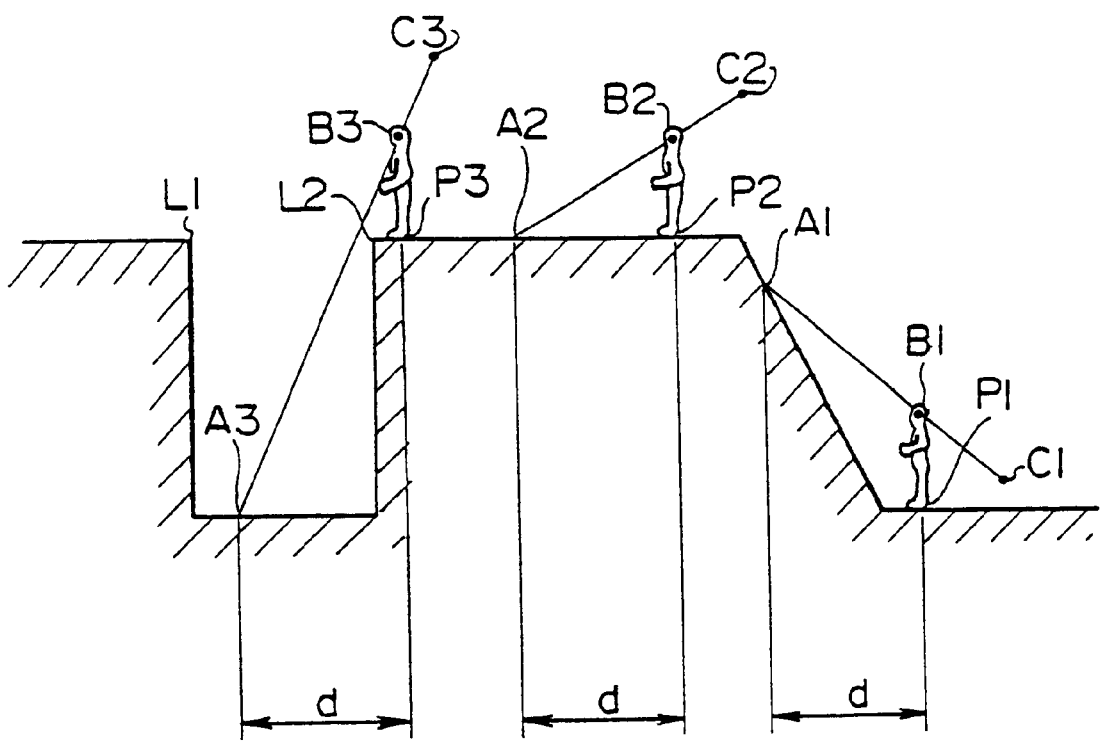
FIG. 6 is a diagram for describing an example of a method for determining the camera position in a first mode for implementing this invention (viewed from side)

FIG. 6 shows a sectional view of a landscape. In this diagram, the character Ch operated by the player is moving from the right to the left. In this case, firstly, there is an uphill slope (point P1), followed by a flat path (point P2), and finally, a deep valley (point P3) (d in FIG. 6 is the same as dHAB in FIG. 4.) The corresponding images displayed are shown in FIG. 7–FIG. 9.

Figure 7:
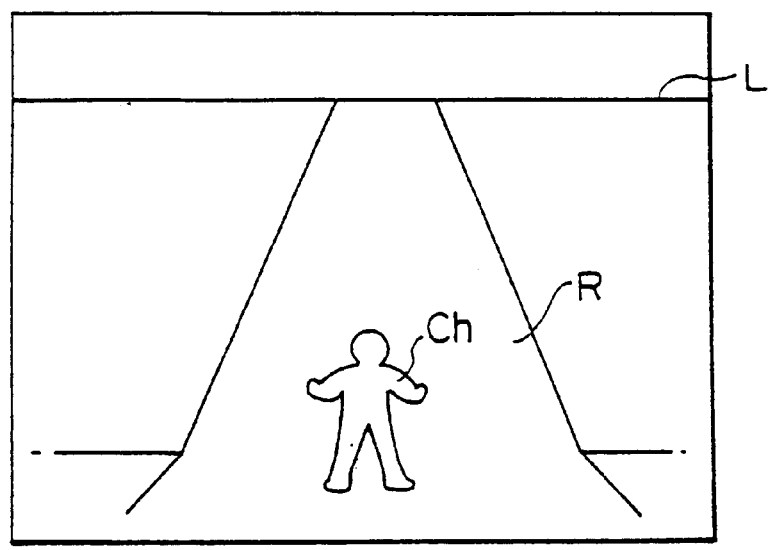
FIG. 7 is a diagram of a screen displayed according to a first mode for implementing this invention.

Firstly, FIG. 7 is described. Character Ch is positioned at point P1 in FIG. 6. Since the landscape in front is an uphill slope, the point on the landscape which is a distance d from point B1 in the horizontal direction. Point C1 is on the straight line linking point A1 and point B1. Since point A1 is in a higher position than point E1, point C1, which is on the other side of point E1 from point A1 is in a lower position than point E1. Therefore, the camera adopts a line of sight looking upwards and in the displayed image, the horizontal line L will be in the upper portion of the display, as shown in FIG. 7. If an image looking upwards in this way is displayed, then the direction in which the character Ch is travelling can be perceived readily, and therefore game operation becomes easier.

Figure 8:
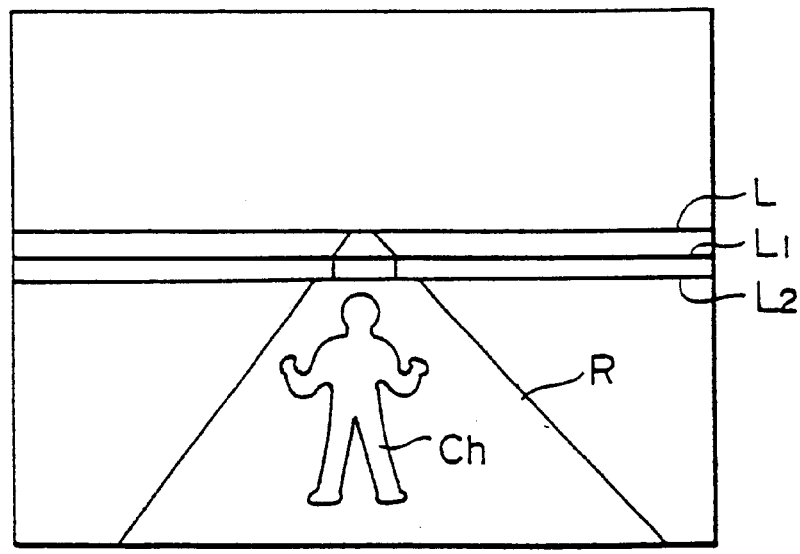
FIG. 8 is a diagram of a further screen displayed according to a first mode for implementing this invention.

Next, FIG. 8 is described. Here, the character Ch is located at point P2 in FIG. 6. The landscape in front of the character is flat, and therefore point A2 is lower than point B2, and point C2 is slightly higher than point B2. Accordingly, the camera adopts a line of sight looking slightly downwards and in the displayed image, the horizontal line L approaches the centre of the display, as shown in FIG. 8. If an image looking slightly downwards in this way is displayed, then the player is able to see into the distance in the direction in which the character Ch is travelling. This line of sight is suitable in cases where, for instance, the player is trying to avoid missiles approaching from in front.

Figure 9:
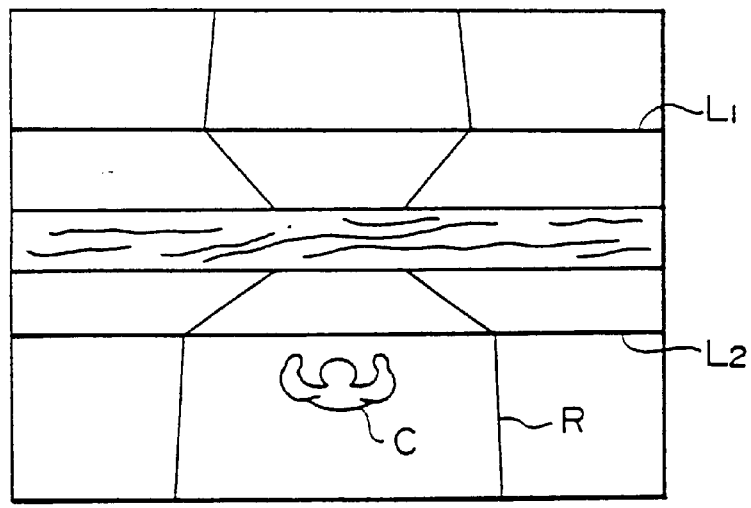
FIG. 9 is a diagram of a further screen displayed according to a first mode for implementing this invention.

Next, FIG. 9 is described. Character Ch is located at point P3 in FIG. 6. Immediately in front of the character there is a very deep valley, and the point on the landscape which is a distance d from point B3 in the horizontal direction is point A3 on the valley floor. Point A3 is much lower than point B3 and point C3 is higher than point B3. Therefore, the camera adopts a line of sight looking almost vertically downwards at a very steep angle, and the displayed image will be as shown in FIG. 9. In this image, the horizontal line L is not displayed, but lines L1, L2 indicating the sides of the valley are displayed. The valley floor is displayed between lines L1 and L2. When an image of this kind is displayed, the player can see in detail the dangerous terrain immediately in front of the character. A line of sight of this kind is appropriate when the player is leaping over a ravine and needs to assess accurately the width of the ravine and the direction in which to jump.

In the description above, the distances between the reference points, dHAB and dBC, had fixed values, which are considered from experience to be most suitable values. However, besides this, it is also possible to set a plurality of distances which are selected as appropriate, these distances being variable so that the distance values are changed according to conditions such as the speed, number, size etc. of the characters.

For example, the distances can be controlled such that if the character is moving at high speed, in order to look at a distant point, distance dHAB is set to a long distance, whilst conversely, if the character is moving slowly, it is set to a short distance. Normally, if the character is moving quickly along a flat road, the player will look into the distance, and if the character is travelling carefully through difficult terrain, the player will look at the landscape close to the character, and therefore by controlling the distance dHAB in the aforementioned manner, it is possible automatically to provide a natural viewpoint.

Furthermore, the distance dBC can be controlled such that, if there is a single character, dBC is set to a short distance, whereas if there is a group comprising a plurality of characters, then dBC is set to a long distance, so that all of the characters can be displayed on the screen. By controlling the distances in this way, it is ensured that all the characters are displayed on the screen at all times.

As described above, according to a first mode of implementing this invention, since a viewpoint in 3D space is calculated by referring to the positional relationship between the landscape and a player's character in a game, relatively simple processing is possible.

Furthermore, since the position of the viewpoint can be moved in real time in response to this positional relationship, which is constantly changing as the player controls the game, it is possible to achieve fine, stepless movement of the viewpoint, in contrast to conventional technology which provides only several types of viewpoint. By the change of screens accompanying this movement of the viewpoint, the player can view the game from the optimum viewpoint at all times. For example, if the character is going up a slope, a viewpoint looking upwards is adopted so that a good view of the top of the slope is obtained, whilst if the character is leaping across a deep valley, by looking directly downwards, the width of the valley can be perceived readily. The appeal of the game graphics is also raised.

Since the viewpoint is moved automatically, requiring no operation by the player, no extra burden is placed on the player.

According to the mode for implementing this invention, since a camera position is determined from a point set inside the character, and a focal point in front of the character, processing involves only simple calculation, and suitable processing can be performed whatever the direction from which the player approaches the landscape. Therefore, it is possible to change the viewpoint in real time in response to any given situation. For example, a suitable viewpoint can be provided even if the character jumps and is in mid-air. If, in contrast to the mode of implementing this invention, the point inside the character and the focal point were defined previously, this would involve a huge number of possible coordinate combinations, which would not be practicable and would make real-time processing extremely difficult.

Second Mode for Implementing the Invention

In the aforementioned first mode for implementing the invention, the viewpoint was determined on the basis of the distance dBC between the reference point B in the character and camera position C, but besides this method, the following type of method is also possible.

As shown by the dotted line in FIG. 4, here, the viewpoint is determined on the basis of a distance dHBC which represents a horizontal projection of the distance dBC between the reference point B in the character and the camera position C. In other words, the camera position C is determined by a similar method to the method for determining reference point A.

In this method, if the angle α in FIG. 4 is close to 90° (for example, when the character is at point P3 in FIG. 6 and is looking down into a deep valley), the distance between reference point B and the camera position C is very large (theoretically, it approaches infinity) and is therefore unnatural. Therefore, a maximum value dmax is set such that the distance dBC does not reach a certain fixed value (dAB<dmax).

In specific terms, the following processing is conducted at step S3 in the flowchart in FIG. 3.

Step S3: Calculating camera position

The camera position C (xC, yC, zC) is determined.

Firstly, the coordinates (xC, zC) of the camera position in the Z plane are determined. The specific method of determining these coordinates is the same as that used in step S1. The distance is taken as dBC and the direction should be reversed. For example, xC=xB, zC=zB−dHBC.

By substituting the coordinates C (xC, zC) thus obtained into the linear equation obtained in step S2, and solving for y, the camera position C (xC, yC, zC) is derived. In this case, the camera direction is from point C towards point A.

According to this method, processing is required to check the distance to the camera constantly so that it does not exceeds its maximum value, but a new function is provided in that the distance to the player can be changed to a certain degree by means of the camera angle. For example, an effect is obtained whereby, when the player looks into a deep valley, the field of view broadens.

In the description above, the distance dHBC between reference points had a fixed value, which was considered from experience to be the most suitable value. Besides this, it is also possible to set a plurality of distances which are selected as appropriate, the distance being variable so that the distance value is changed according to conditions such as the speed, number, size etc. of the characters.

Third Mode for Implementing the Invention

In the aforementioned first and second modes for implementing the invention, viewpoint C is determined by taking the reference point A as a point which is a certain distance in front of the character, but besides this method, if the character was fighting with enemy characters, for example, then the coordinates of that enemy could be used as a reference.

This method is now described using FIG. 10–FIG. 13.

Figure 10:
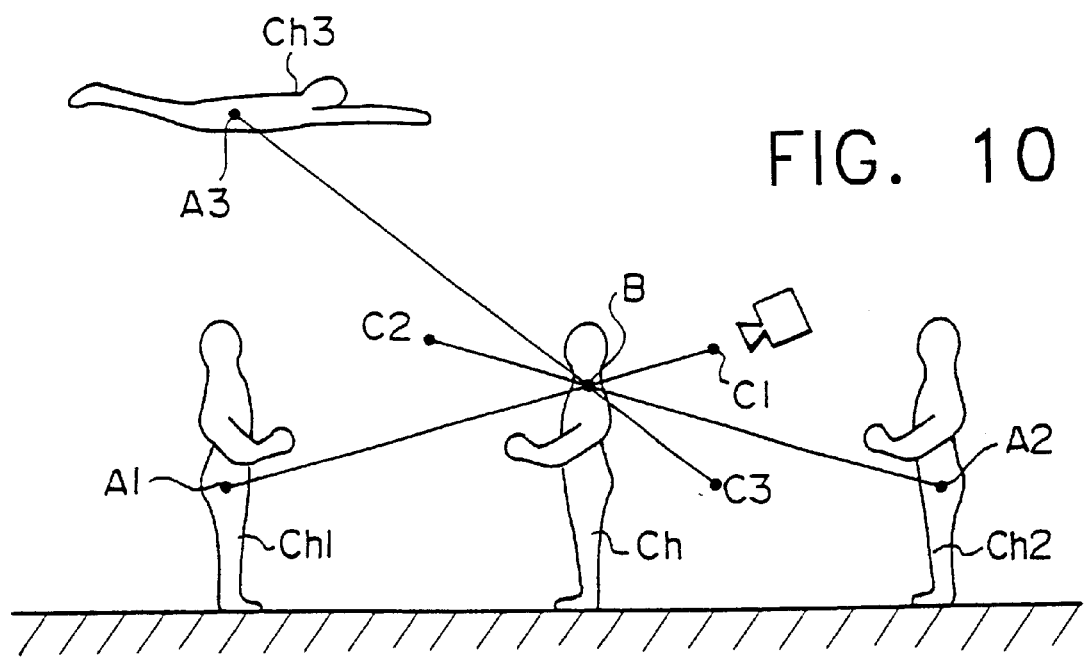
FIG. 10 is a diagram for describing a method of determining a camera position in a third mode for implementing this invention.

FIG. 10 is a side view of a character Ch and enemy characters Ch1–Ch3. The character Ch controlled by the player is in the centre of the diagram, and there is an enemy character Ch1 in front of the character Ch, an enemy character Ch2 behind him, and an enemy character Ch3 in the air in front of him. The enemy characters Ch1–Ch3 reference points A1–A3 inside them, respectively. Camera positions C1–C3 exist on the extensions of the straight lines linking each of these reference points A1–A3 with reference point B. These camera positions are determined by a similar method to that used in the first or second modes of implementation.

The reference points A1–A3 may be in any position provided that they correspond to the location of the enemy characters Ch1–Ch3. The following examples may be conceived.

The reference points are located at the waist of the enemy character. Since the reference point B is usually located neat the head portion of the character Ch, then if the reference points A are positioned at the waist of the enemy character, the camera line of sight will appear to look slightly downwards. FIG. 10 illustrates such a case.

The reference points are located at the head region of the enemy characters. In this case, the camera line of sight looks directly forward at the enemy characters.

The reference points are located above the heads of the enemy characters. In this case, the camera line of sight appears to lock slightly upwards. The reference points may be located outside the characters in this way. This also applies to reference point B.

The specific procedure for determining a camera position C from the reference points A and b is the same as that used in the first and second modes of implementation.

Figure 11:
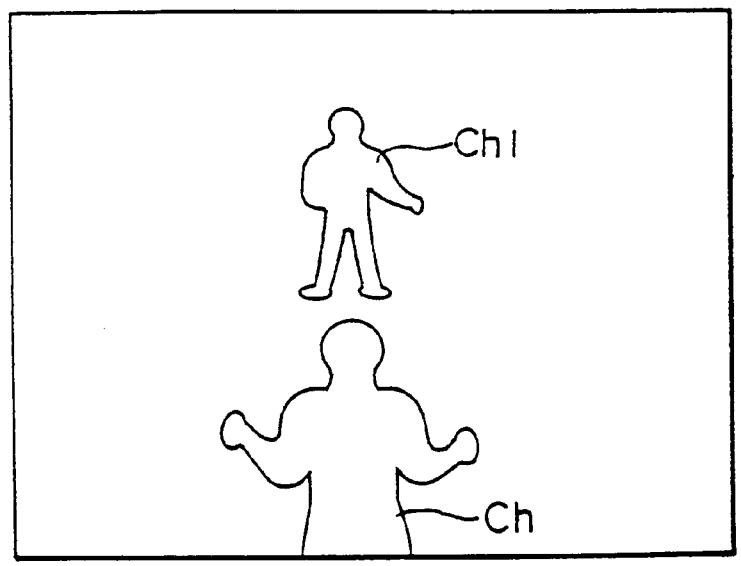
FIG. 11 is a diagram of a screen displayed according to a third mode for implementing this invention.

FIG. 11 shows an example of a screen displayed when the camera position is at C1 in FIG. 10. There is an enemy character Ch1 in front of the character Ch and they are facing each other. Since the camera position C1 is slightly above, the image gives an impression of looking downwards and the whole figure of the enemy character is displayed.

Figure 12:
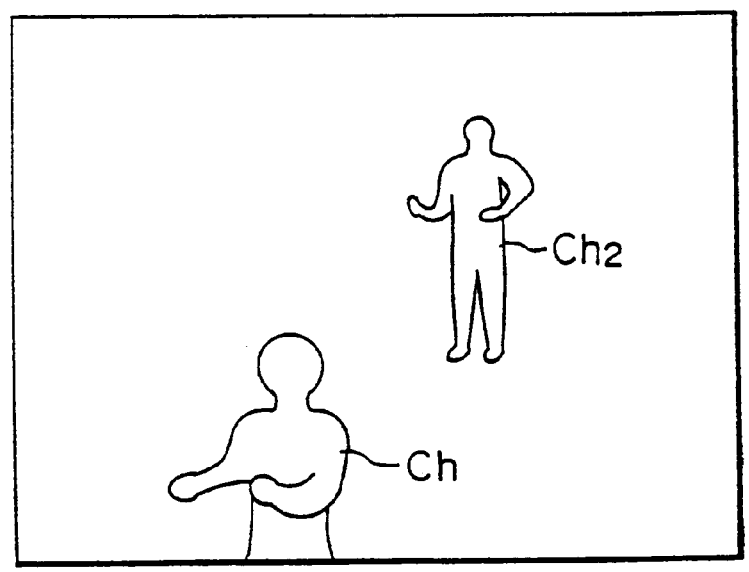
FIG. 12 is a diagram of a further screen displayed according to a third mode for implementing this invention.

FIG. 12 gives an example of a screen displayed when the camera position is at C2 in FIG. 10. There is an enemy character Ch2 behind the character Ch. In this way, even if the character is approached from behind by an enemy character, the enemy character is not lost from view and the character is not liable to surprise attacks.

Figure 13:
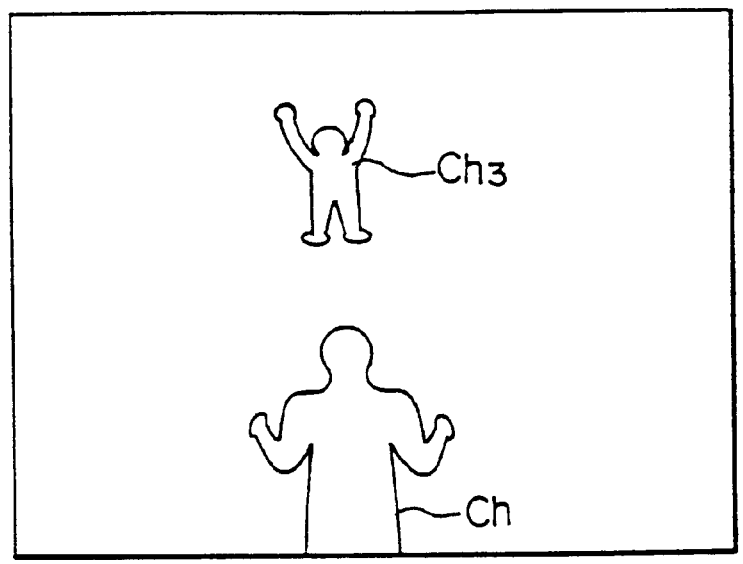
FIG. 13 is a diagram of a further screen displayed according to a third mode for implementing this invention.
Figure 14:
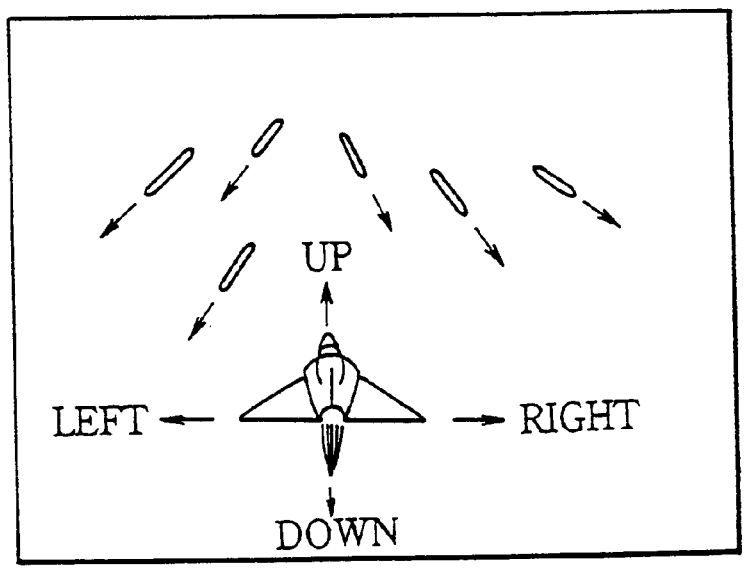
FIG. 14 is an illustrative diagram of a camera position in a shooting game.

FIG. 13 shows an example of a screen when the camera position is at C3 in FIG. 10. The enemy character Ch3 is flying in mid-air and the view is looking up this character from below.

According to the mode of implementing this invention, the direction of the line of sight is not necessarily the same as the orientation of the player's character, but the opponents are always displayed on the screen. Furthermore, in a fighting game, or the like, since the player continuously has to carry out actions in response to an enemy, according to the mode for implementing this invention, the direction of the line of sight forms a guide for the direction in which the character should be facing, thus providing the advantage of raising the player's control of the game, As described above, according to this invention, in an image processing device, which generates images wherein a central figure and peripheral figures set in a virtual spatial coordinates system are viewed from a prescribed viewpoint, and outputs image display signals corresponding to these images, since the image processing device relating to this invention comprises focal point calculating means for determining a second point on the peripheral figures on the basis of a first point previously set with respect to the central figure, line of sight calculating means for determining a line of sight on the basis of the first point and the second point, viewpoint calculating means for determining the viewpoint on the basis of the first point and the line of sight, and image signal generating means for generating the image display signals corresponding to the image viewed from the viewpoint in the direction of the line of sight, an optimum viewpoint can be provided automatically, thereby creating a favourable game environment.

According to this invention, since said focal point calculating means determines a point on the peripheral figure which is a predetermined first distance from the first point, and sets this point as the second point, it is possible to determine the second point by means of relatively simple processing.

According to this invention, since the first distance is determined in accordance with the movement of the central figure, the viewpoint can be changed as appropriate in response to the circumstances of the central figure, and a more favourable game environment can be created, According to this invention, when the peripheral figure contains a moving figure, since said focal point calculating means takes a point corresponding to the moving figure as the second point, it is possible to display moving figures on the screen at all times, and an opponent is never lost from view.

According to this invention, since said viewpoint calculating means determines a point on the line of sight, which is a predetermined second distance from the first point, and sets this point as the viewpoint, it is possible to determine the viewpoint by means of relatively simple processing.

According to this invention, since the second distance is taken as a distance in the horizontal plane, coordinates which are at the second distance from the first point projected in this horizontal plane are determined, these coordinates are taken as the horizontal plane coordinates of the viewpoint, and the viewpoint is determined on the basis of these horizontal plane coordinates, and moreover, a maximum value is determined for the distance between the first point and the second point, and if this maximum value is exceeded, the viewpoint is determined such that the distance between the first point and the viewpoint does not exceed the maximum value, regardless of the second distance, then it is therefore possible to add a new function whereby the distance between the viewpoint and the player is changed to a certain degree by means of the angle of the line of sight. For example, when the player is looking into a deep valley, this has the effect of broadening the field of view.

According to this invention, since the second distance is determined according to the size of the central figure, the viewpoint can be changed as appropriate in response to the circumstances of the central figure, thereby providing a more favourable game environment.

INDUSTRIAL APPLICABILITY

As described above, the image processing device, game machine using this processing device, image processing method and medium relating to the present invention are applicable to computer graphics for displaying an image whereby a central figure and peripheral figures set in a virtual spatial coordinates system are viewed from a certain viewpoint, for example, they are applicable to a system whereby, when determining a viewpoint in a three-dimensional game (3D game), whilst in general a "camera" is envisaged and the direction in which the "camera" is pointing and the spatial coordinates it is occupying are set, in this process of "determining camera coordinates and angle", the viewpoint is automatically adjusted to an optimum viewpoint by reference to the relationship between the player's character and the landscape.

What is claimed is:

1. In a computer system wherein a game program is executed in response to signals from a peripheral device manipulated by a player, a data processing method for generating date for displaying on a display an image of a player controlled object movements of which are controlled against a terrain in a virtual three dimensional space in response to manipulation of a peripheral device by the player, the data processing method comprising the steps of:

(a) providing a reference point representing said player controlled object and a viewpoint set at a predetermined distance from said player controlled object in said virtual three dimensional space, said viewpoint being defined by a viewpoint position and a view direction viewing said player controlled object from said viewpoint position;

(b) setting, in response to manipulation of a peripheral device by a player, an action direction in which said player-controlled object is to make an action;

(c) detecting the viewpoint position and view direction;

(d) adjusting the viewpoint position and the view direction with reference to terrain data corresponding to the terrain positioned in the set action direction according to the detected viewpoint position and view direction; and (e) generating data for displaying the player-controlled object and the terrain.

2. The data processing method according to claim 1, wherein said terrain data comprises data for a terrain reference point which is defined as a surface point of the terrain positioned at a predetermined distance from said player-controlled object in said virtual three dimensional space.

3. The data processing method according to claim 2, wherein the viewpoint is adjusted so that it is aligned in a straight line with said reference point representing said player-controlled object and said terrain reference point.

4. The data processing method according to claim 1, wherein said terrain data comprises data for an enemy reference point fixed with respect to an enemy character object.

5. The data processing method according to claim 4, wherein the viewpoint is adjusted so that it is aligned in a straight line with said reference point representing said player-control object and said enemy reference point.

6. A computer game device comprising:

a peripheral device which supplies the game device with signals in response to manipulation by a player;

a memory means for storing a game program and data for providing a terrain and a player-controlled character moving on the terrain in a virtual three dimensional space, said game program further providing a reference point representing said player-controlled character and a viewpoint set at a predetermined distance from said player-controlled character in said virtual three dimensional space, said viewpoint being defined by a viewpoint position and a view direction viewing said player-controlled character from said viewpoint;

execution means for executing the game program in response to said signals from the peripheral device so as to cause the player-controlled character to move on the terrain, so as to set, in response to the manipulation of the peripheral device by a player, an action direction in which said player-controlled object is to make an action and detect the viewpoint position and view direction, and adjust the viewpoint position and view direction to an adjusted viewpoint with reference to the terrain data of the said terrain positioned in the set action direction according to the detected viewpoint position and view direction; and image data generating means which generates data for displaying images of the player-controlled character and the terrain viewed from the adjusted various viewpoints in response to manipulation by the player.

7. A computer game device as defined in claim 6, wherein said predetermined distance is determined in accordance with the size of said player controlled character.

8. A computer game device as defined in claim 6, wherein said player controlled character comprises a plurality of figures, said predetermined distance being determined according to the number of said plurality of figures.

9. A computer game device as determined in claim 6, wherein said player controlled character comprises a plurality of figures, said predetermined distance being determined according to the distribution of said plurality of figures.

10. In a computer system executing a game program in response to signals from a peripheral device manipulated by a player and generating data for displaying an image of a player-controlled object movements of which are controlled against a terrain in a virtual three dimensional space in response to manipulation of a peripheral device by the player, a game program which causes the computer system to execute a data processing method comprising the steps of:

(a) providing a reference point representing said player-controlled object and a viewpoint set at a predetermined distance from said player-controlled object in said virtual three dimensional space, said viewpoint being defined by a viewpoint position and a view direction viewing said player-controlled object from said viewpoint position;

(b) setting, in response to manipulation of a peripheral device by a player, an action direction in which said player-controlled object is to make an action;

(c) detecting the viewpoint position and view direction;

(d) adjusting the viewpoint position and view direction to an adjusted viewpoint with reference to terrain date corresponding to said terrain positioned in the set action direction according to the detected viewpoint position and view direction; and (e) generating data for displaying the player-controlled object and the terrain viewed from the adjusted viewpoint.

11. A game program as defined in claim 10, wherein said predetermined distance is determined in accordance with the size of said player controlled character.

12. A game program as defined in claim 10, wherein said player controlled character comprises a plurality of figures, said predetermined distance being determined according to the number of said plurality of figures.

13. A game program as defined in claim 10, wherein said player controlled character comprises a plurality of figures, said predetermined distance being determined according to the distribution of said plurality of figures.

14. A computer game device comprising:

a peripheral device which supplies the game device with signals in response to manipulation by a player;

a memory means for storing a game program and data for providing a terrain and a player-controlled character moving on the terrain in a virtual three dimensional space, said game program further providing a reference point representing said player-controlled character and a viewpoint set at a predetermined distance from said player-controlled character in said virtual three dimensional space, said viewpoint being defined by a viewpoint position and a view direction viewing said player-controlled character from said viewpoint;

execution means for executing the game program in response to said signals from the peripheral device so as to cause the player-controlled character to move on the terrain, so as to set, in response to the manipulation of the peripheral device by a player, an action direction in which said player-controlled object is to make an action and detect the viewpoint position and view direction, and adjust the viewpoint position and view direction to an adjusted viewpoint with reference to the terrain data of the said terrain positioned in the set action direction according to the detected viewpoint position and view direction; and image data generating means which generates data for displaying images of the player-controlled character and the terrain viewed from the adjusted various viewpoints in response to manipulation by the player, wherein said execution means includes focal point calculating means for determining a second point on said peripheral figures on the basis of a first point previously set with respect to said central figures, line of sight calculating means for determining a line of sight on the basis of said first point and said second point, viewpoint calculating means for determining said viewpoint for generating images on the basis of said first point and said line of sight, and image signal generating means for generating said image display signals corresponding to the image viewed from said view point in the direction of said line of sight, wherein said viewpoint calculating means determines a point on said line of sight which is at a predetermined second distance from said first point and sets this point as said viewpoint.

15. The computer game device according to claim 14 characterized in that said second distance is determined in accordance with the size of said central figure.

16. The computer game device according to claim 15 characterized in that said second distance is determined in accordance with the size of said central figure.

17. The computer game device according to claim 14 characterized in that, if said central figure comprises a plurality of figures, said second distance is determined according to the number of said plurality of figures.

18. The computer game device according to claim 14 characterized in that, if said central figure comprises a plurality of figures, said second distance is determined according to the distributed thereof.

19. The computer game device according to claim 14 characterized in that, if said central figure comprises a plurality of figures, said second distance is determined according to the number of said plurality of figures.

20. The computer game device according to claim 14 characterized in that, if said central figure comprises a plurality of figures, said second distance is determined according to the distributed thereof.

* * * * *